United States Patent [19]

Christine

[11] 4,349,133

[45] Sep. 14, 1982

[54] DISPENSER AND REFILL PACKAGE

[76] Inventor: William C. Christine, 341 St. John St., Catasauqua, Pa. 18032

[21] Appl. No.: 74,736

[22] Filed: Sep. 12, 1979

[51] Int. Cl.³ .............................................. G01F 11/02
[52] U.S. Cl. .................................... 222/183; 222/207; 222/214
[58] Field of Search ............... 222/207, 214, 380, 490, 222/185, 183; 251/7; 417/474, 479

[56] References Cited

U.S. PATENT DOCUMENTS

| | | | |
|---|---|---|---|
| 3,768,704 | 10/1973 | Beguin | 222/207 |
| 3,790,313 | 2/1974 | Magerle | 222/214 X |
| 3,870,201 | 3/1975 | Asplund | 222/214 X |
| 4,106,508 | 8/1978 | Berlin | 251/7 X |
| 4,130,224 | 12/1978 | Norman et al. | 222/214 X |
| 4,178,975 | 12/1979 | Crespi | 222/207 X |

FOREIGN PATENT DOCUMENTS 396558  8/1973  U.S.S.R. ............................. 222/207

*Primary Examiner*—Charles A. Marmor
*Attorney, Agent, or Firm*—Sherman Levy

[57] ABSTRACT

A dispenser is provided that includes a hollow housing in which is mounted a disposable container that holds materials such as fluidic material to be dispensed. There is provided a service unit which consists of a package or bag holding the fluidic material and wherein the bag has an accordion type construction. The service unit includes a pump tube which is molded as part of the container, and a check valve forms part of the service unit, with the check valve being mounted on an end of the pump tube. An operating lever or mechanism is provided for selectively dispensing metered quantities of material from the accordion package.

7 Claims, 7 Drawing Figures

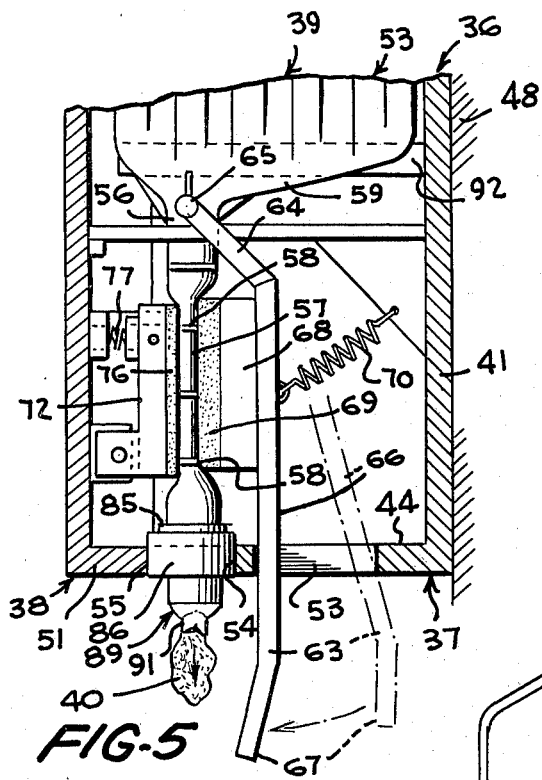
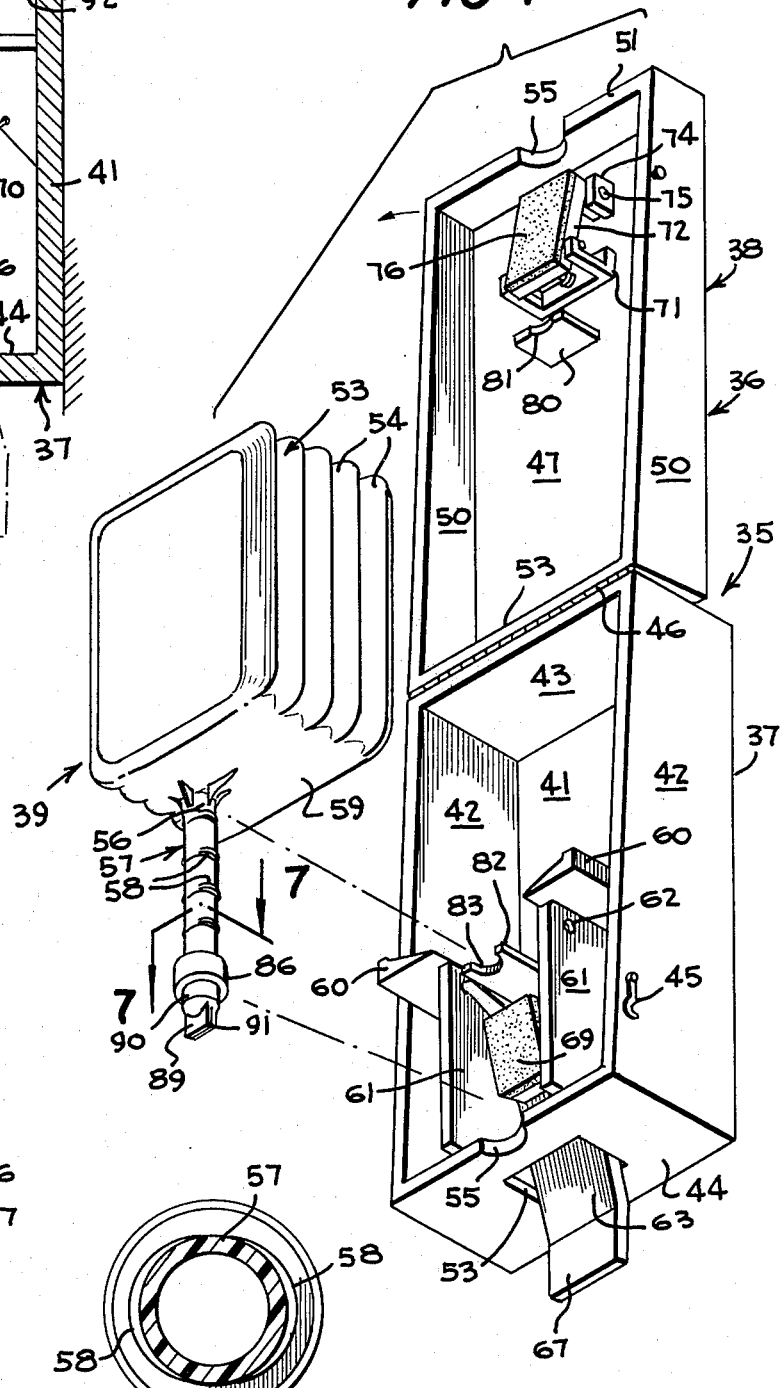
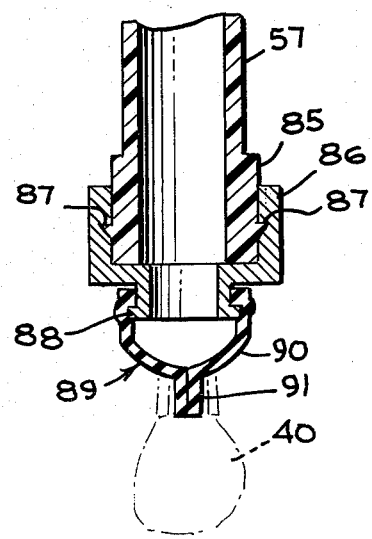
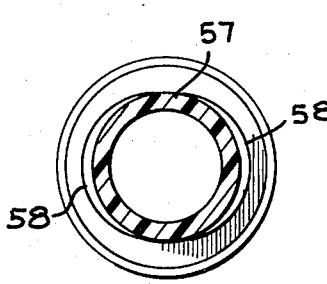
FIG-1
FIG-5
FIG-6
FIG-7

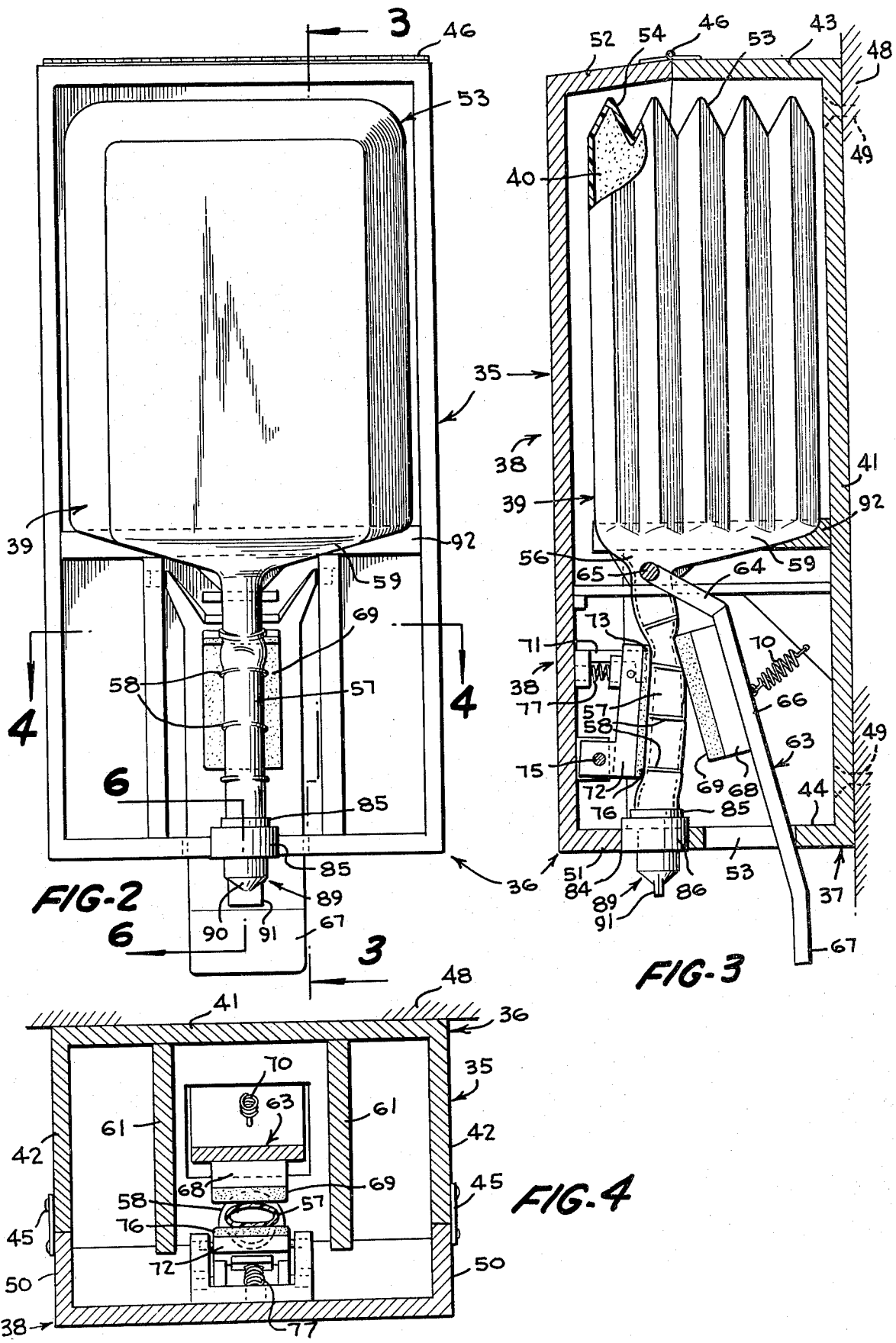

DISPENSER AND REFILL PACKAGE

FIELD OF THE INVENTION

As is known there have been various types of dispensers previously provided such as those shown in prior U.S. Pat. Nos. 3,066,832, 2,113,022, 3,768,704, 3,930,761, 3,870,201, 4,130,224, and 3,881,641. However, neither of these prior patents nor any others known to applicant afford the advantages and features provided by the invention of the present application.

BACKGROUND AND SUMMARY OF THE INVENTION

In accordance with the present invention there is provided a dispenser that includes a hollow housing that has an accordion type package or flexible bag therein that holds the material to be dispensed. The material may be paste like, liquid, semi-solid or the like. A highly efficient means is provided for dispensing metered quantities of the material from the package.

With the present invention there is provided a disposable package or bag wherein after the contents have been dispensed from the bag, a new bag of material can be inserted in the housing or cabinet. The device is constructed so that the material within the package does not contact the operating mechanism, so that a sanitary method and means of dispensing is provided which meets the high rigid environmental requirements presently in effect.

A primary object of the present invention is to provide a dispensing system wherein the material will be caused to efficiently flow from the package or container through a dispensing pump, and wherein the container or package will be completely emptied when in fully collapsed condition.

A further object of the present invention is to provide a dispenser that has a novel collapsible or foldable container, and wherein when finger pressure or other pressure is applied to the operating lever, the contents of the package or bag will be dispensed in a metered quantity or amount as desired or required.

A still further object of the present invention is to provide a relatively uncomplicated dispensing apparatus for dispensing fluidic material which may be semi-liquid, paste like or the like, and wherein the material is readily available. The dispenser may be wall mounted or can be mounted on a suitable supporting structure, and the dispenser will accommodate interchangeability of materials to be dispensed therefrom.

A still further object of the present invention is to provide a dispenser which is capable of dispensing both liquid and viscous products wherein the device includes a package or bag that is disposable, and wherein the package is characterized by ease of filling and assembly.

A still further object of the present invention is to provide a hollow tubular structure contracted with spaced memory elements along the wall of the hollow tubular structure for providing upon actuation by mechanical means successive contractions or expansions resulting by action of the memory elements for pushing or forcing material axially along the hollow tubular structure, which arrangements are more generally referred to herein as peristaltic pump and which is made as part of a blow molded package, and wherein this is accomplished by adding to the tubular section memory enhancing rings. The rings have an elliptical shape which increases the tendency of the material in the tube to return to its round shape without requiring the force required to obtain the peristaltic squeeze effect. The container portion has no memory, and the pump tube section does have a memory.

It is still a further object of the present invention to provide a novel dispenser including a product dispensing bag or package which is constructed to eliminate difficulty encountered heretofore. Metering of the desired amount of the material is provided by the use of a lever or handle.

It is a still further object of the present invention to provide a dispenser that includes a container that has accordion pleats which allow the container to collapse. There is further provided in the service unit or package a tubular section which has memory enhancing rings so that the desired contrast and characteristics can be accomplished.

It is another object of this invention to provide a device for expelling the contents of a collapsible package wherein the device can be operated with only one hand.

A still further object of the present invention is to provide a dispenser that has advantages and improved characteristics as compared to previous such devices, and wherein the present invention is relatively simple and inexpensive to manufacture and use.

For a better understanding of the present invention together with other and further objects thereof, reference is made to the following description taken in connection with the accompanying drawing and its scope will be pointed out in the appended claims.

BRIEF DESCRIPTION OF THE DRAWINGS

FIG. 1 is a perspective view showing the parts separated for clarity of illustration.

FIG. 2 is a vertical view taken through the device or dispenser.

FIG. 3 is a sectional view taken on the line 33 of FIG. 2.

FIG. 4 is a sectional view taken on the line 44 of FIG. 2.

FIG. 5 is a fragmentary sectional view similar to FIG. 3 but showing the parts in adjusted position as when the material is being dispensed.

FIG. 6 is a fragmentary sectional view taken on an enlarged scale and taken on the line 66 of FIG. 2.

FIG. 7 is an enlarged sectional view taken on the line 77 of FIG. 1.

DESCRIPTION OF THE PREFERRED EMBODIMENTS

Referring in detail to the drawings, the numeral 35 indicates the dispenser of the present invention which is shown to comprise a hollow housing or cabinet 36 that includes a base portion 37 and a cover member 38, FIG. 1. Mounted within the housing 36 is a disposable package or bag 39 that has a body portion 53 that has an accordion type construction so that there is provided accordion folds 54 therein. The package 39 is adapted to be filled with the material 40 to be dispensed as later described in this application.

As later described in this application, the package includes as an integral formation, a pump tube which is molded as part of the container, and a check valve is formed as part of the package on the lower end of the pump tube.

The base portion of the housing 36 is shown to comprise a back wall 41 as well as spaced parallel side walls 42, and spaced apart top and bottom walls 43 and 44. A latch 45 is provided for selectively retaining or maintaining the cover 38 in closed position on the base portion 37. A hinge 46 is provided for hingedly connecting the cover 38 to the base portion 37. The housing 36 may be secured to a vertical wall 48 as for example by means of securing elements or screws 49. However, it is to be understood that the housing or dispenser 35 can be mounted on a pedestal, console, or any other suitable supporting structure.

The cover 38 includes spaced apart side sections 50, a flat section 47, and end sections 51 and 52 as shown in the drawings.

The bottom wall 44 of the base portion 37 is provided with a slot 53 therein. The portions 44 and 51 are provided with cooperating arcuate recesses 55 which define a circular opening when the cover is in closed position on the base portion.

Depending from the package 39 and secured thereto and formed integral therewith is a spout 56. The body portion 53 of the package 39 is of flexible material such as flexible plastic material, and the bottom of the package is indicated by the numeral 59. Connected to the spout 56 is a tube 57 that defines a pump, and the tube 57 is made of elastomeric material that has inherent resiliency therein. A plurality of enlarged portions 58 are formed on a part of the outer periphery of the tube 57, as for example as shown in FIG. 7. The enlarged portions 58 are in the form of elliptical rings which provide memory enhancing rings so that the desired contrasts and characteristics can be accomplished.

Mounted in the base portion 37 are suitable support pieces 60 which have wall pieces 61 adjacent thereto, and the wall pieces 61 have apertures or openings 62 therein. The numeral 63 indicates a lever or handle that can be manually operated or else the lever 63 can be operated by a power source. The lever 63 includes a portion 64 that is operatively connected to a shaft or pin 65 that extends through the aperture 62. The lever 63 further includes a portion 66 that extends through the slot 53, and the lever 63 further includes a manually engageable portion 67 which is convenient to the operator's fingers.

Secured to the portion 66 of the lever 63 is a block 68 that has a resilient pad 69 affixed thereto, and a spring member 70 is provided for urging or biasing the lever 63 in the proper direction, FIG. 3.

Support pieces 71 and 74 are mounted in the cover member 38, and a block 72 is adjustably connected to these support pieces as at 75. A yieldable pad 76 is affixed to the block 72 in any suitable manner. One or more spring members 77 are provided for urging or biasing the block 72 and pad 76 into engagement with the pump tube 57 as shown in FIGS. 3 and 5. An end member 80 is mounted in the cover 38, and the end member 80 has a recessed portion 81, FIG. 1. Mounted in the base portion 37 is a member 82 which has a recess 83, and the recesses 81 and 83 co-act to define a clamp for a portion of the tube 57 when the cover 38 is in closed position on the base portion 37.

The tube 57 is molded as part of the container 39.

The lower end of the pump tube 57 has an enlargement 85 that is adapted to snap into a fitting 86, and the fitting 86 is received in the opening defined by the recesses 55. The enlarged lower end portion 85 of the tube 57 can be maintained in engagement with the fitting 86 by means of a flange or lip 87, FIG. 6. Depending from the fitting 86 is a neck 88, and a valve such as a duck valve 89 is arranged in engagement with the neck 88. The valve 89 is made of elastomeric material, and the valve 89 includes a resilient body portion 90 as well as an extension 91 that can be opened and closed as the lever 63 is operated to force the material 40 down through the valve 89 as shown in FIG. 6 and in FIG. 5.

Suitable support elements or shelves 92 can be arranged within the housing 36 to support the package 39 containing the material 40 being dispensed.

From the foregoing, it will be seen that there has been provided a dispenser, and in use with the parts arranged as shown in the drawings, when the device is to be used, the cover 38 can be moved to an open position as shown in FIG. 1 relative to the base portion 37 due to the provision of the hinge 46. Then, the package or bag 39 with the material 40 therein is placed in the housing 36 of the dispenser 35 so that the pump tube 57 extends down through the recess 83. With the filled service unit 39 in place, the cover 38 is moved to its closed position as shown in FIGS. 3 and 4 for example, and the latches 45 can be used for maintaining the cover 38 in closed position. With the cover 38 in closed position, it will be seen that the pump tube 57 will be positioned between the yieldable pads 69 and 76, as shown in FIG. 3. Thus, before the material is dispensed, the parts can be in a position such as that shown in FIG. 3.

When it is desired to dispense a metered quantity of material, finger pressure is applied to the projecting lower end 67 of the lever 63 so that the tube 57 will be squeezed between the pads 76 and 69 whereby a metered quantity of material in the tube will be dispensed downwardly through the valve 89 on to the desired location. For example, soap or the like can be dispensed into a person's hands, but it is to be understood that the present invention is not limited to the dispensing of soap since any desired type of suitable material can be dispensed from the unit.

When manual pressure is released on the portion 67 of the lever 63, the spring such as the spring 70 will return the parts from a position such as the solid line position shown in FIG. 5 to the broken line position, FIG. 5 so that the device is ready for the next cycle.

It will be noted that the pad 76 is mounted on a yieldable or resilient mounting including the member 72 which is spring supported as at 77 so that there will be the proper co-action between the pads 69 and 76 to cause the pumping action to take place.

The tube 57 has enlargements 58 thereon, and the enlargements or rings function as memory enhancing rings. Thus, after the tube has been squeezed or has pressure exerted thereon, the inherent memory or resiliency of the tube will cause the tube to return from a position such as that shown in FIG. 4 to a position such as that shown in FIG. 7 whereby the dispenser is ready for the next operating cycle.

It will be noted that the duck valve 89 is of the type that includes the normally closed end portion 91. However, when sufficient or proper pressure is applied to the tube by means of the lever 63 and cooperating parts, the portion 91 will move from a closed position such as that shown in solid lines in FIG. 6 to an open position such as that shown in broken lines in FIG. 6 whereby the material 40 can be dispensed. When pressure is released, the valve 89 including the portion 91 will automatically return to its closed position so that only a metered quantity of material will be dispensed therefrom.

It will be understood that after the contents of the bag or service unit 39 have been used up, the latches 45 can be opened so that the cover 38 can be swung to an open position such as that shown in FIG. 1 whereby another service unit 39 that is filled with material 40 can be inserted in the dispenser in place of the empty bag 39, and the empty bag can be disposable. Then, the cover 38 can be closed on the new bag or package, and the dispenser is again ready for the continued cycle of operations.

The parts can be made of any suitable material and in different shapes or sizes as desired or required.

It will be noted that when the device is being used, that the user manually moves the lever 63 so that the block 68 and pad 69 continue to travel down along the tube 57 from a position such as that shown in FIG. 3 to a position such as that shown in FIG. 5 so as to force the fluidic material out. Then, when the lever 63 is released, the block 68 and pad 69 are returned to their original position so as to permit the tube 57 to refill from the body portion 53 of the service unit 39.

The container may be made of any suitable material and may be made by a thermo-forming process. The elastomeric tube 57 functions as a peristaltic pump.

Due to the provision of the accordion folds 54 in the portion 53, as the product is extracted from the container, the container will collapse from the force of atmospheric pressure, and the slight vacuum effect created by the extraction pump tube 57. A suitable process can be provided for creating, filling, and sealing the containers 39, and the tube 57 or spout 56 can function as a means for permitting the unit 39 to be initially filled.

The dispenser consists of a cabinet with a door or cover that is appropriately latched. When the device is being used, the door is opened and the airless collapsible container type of package 39 is placed in the dispenser so that the pump tube 57 is extended down along the proper position. To operate the device, the user engages the portion 67 with his or her fingers and moves the lever 63 so that the pad 69 progressively moves down the tube 57 in cooperation with the pad 76. Release of the operating arm or lever 63 by the user permits springs to return the parts to their initial position, and this completes the cycle of operation. On the forward stroke, as the operating lever 63 is advanced, more and more pressure is exerted against the elastomeric tube 57 until pressure on the tube completely closes the tube. Thereafter, as the operating arm advances further, it forces the fluid contained in the lower part of the tube down through the check valve 89 discharging through the orifices provided.

Further, at the end of the forward stroke, and the release of the operating lever, the pads travel back up the essentially empty tube, and the pressure of the fluid in the collapsible container 39 combined with atmospheric pressure is sufficient to cause the fluid or liquid to flow down and refill the tube, and the operating cycle then repeats.

It will be noted that the peristaltic pump has been made as part of the blow molded package. This is accomplished by adding to the tubular section memory enhancing rings 58. These rings 58 have an elliptical shape and increase the tendency of the material in the tube to return to its round shape, without increasing the force required to obtain the peristaltic squeeze effect. It will be noted that considering the strict requirements of the package, that the container part, the physical requirements of the pump tube are in contradiction. In other words, the container portion has no memory, and the pump tube section has a memory. This has been accomplished in one structure by the contrast in the physical shape of the two areas. In the container section there is provided the accordion pleats 54 which allow the container to collapse. In the tubular section 57 there is provided the memory enhancing rings 58 so that there can be achieved the desired contrast and characteristics. This is a very significant part of the invention.

With further reference to the pump section of the dispenser, there is provided opposing pads 69 and 76 of elastomeric materials. While this occurs in previous U.S. Pat. No. 3,870,201, in this prior patent, the elastomeric material is used on one side only. With the present invention, which includes a different method of obtaining the peristaltic squeeze, it is essential that elastomeric faces be used to allow for the inclusion of the memory enhancing rings 58. As can be seen, if opposing faces of rigid material were used, there would be no adaptation to the irregular surfaces of the pump tube with its external rings. Further, with this style of pump, it is possible to use a very simple duck bill valve 89 as a check valve on the system, providing an extremely low cost simple package, less elaborate than any of the prior patents or other devices.

It will therefore be seen that the pump tube is molded as part of the container, as contrasted to a prior patent such as U.S. Pat. No. 4,130,224. The tubular section functions in a peristaltic manner. The service unit is made in one molding operation. Thus, the package is molded from a material that has no memory so that it will have a very limited tendency to go back to its original shape. The rings increase the memory of that sector of the package. While a duck valve 89 has been illustrated in the drawings, it is to be understood that any suitable type of valve can be used instead of a duck valve.

While several embodiments of the present invention have been illustrated herein in particular detail, it will be understood that variations and modifications may be effected without departing from the spirit and scope of the novel concepts of this invention.

What is claimed:

1. A dispenser for dispensing a predetermined metered quantity of fluidic material, said dispenser comprising:
   housing means;
   means, removably mounted in said housing means, for holding said fluidic material;
   cover means attached to said housing means for covering said holding means when the latter is in said housing means;
   peristaltic-acting tube means depending from said holding means including valve means operatively connected thereto;
   first lever means pivoted to said housing means for compressing said tube means;
   second lever means biased away from said cover means for engaging said tube means when said first lever means compresses said tube means;
   said first and second lever means moving in the same direction when said tube means is compressed, so that said tube is initially pinched therebetween thereby trapping said predetermined quantity of material.

2. The dispenser of claim 1 wherein said holding means collapses as said material is dispensed therefrom, and said tube means unitarily depends from said holding means.

3. The dispenser of claim 1 wherein said first lever means is normally spaced from said tube means and said second lever means is pivotally attached to the cover means.

4. The dispenser of any one of claims 1, 2 or 3 wherein said first and second lever means move in the same direction to facilitate expansion of said tube means.

5. The dispenser of claim 4 wherein expansion of said tube means is further facilitated by ring means carried by said tube means.

6. The dispenser of claim 5 wherein said ring means comprise a plurality of members of memory material encircling said tube means at spaced locations therealong, said holding means being of a non-memory material.

7. The dispenser of claim 1 wherein said first lever means comprises a manually movable member having a portion projecting from said housing means engageable by a user's fingers, and said first and second lever means carry blocks thereon substantially facing each other, each block having a resilient pad affixed thereto for engagement with said means when the latter is compressed therebetween.

* * * * *